United States Patent [19]

Chung et al.

[11] 3,953,181
[45] Apr. 27, 1976

[54] FILTER DEVICE
[76] Inventors: Chin Kuo Chung, No. 4, An Tung Road; Hsing Shang Chen, No. 29, Kuang Fu St., Tung Ning Road, both of Chu Tung Hsin Chu Hsien, China /Taiwan
[22] Filed: June 24, 1974
[21] Appl. No.: 482,616

[52] U.S. Cl. ................................ 55/228; 55/241; 55/260; 55/413; 55/418; 55/431; 261/17; 261/112; 261/126; 110/119
[51] Int. Cl.² .......................................... B01D 47/00
[58] Field of Search ............ 55/227, 228, 229, 240, 55/241, 4 B, 418, 260, 421, 463, 431; 261/112, 126, 17; 110/119

[56] References Cited
UNITED STATES PATENTS

| 1,570,577 | 1/1926 | Romero et al. | 261/126 |
| 1,618,099 | 2/1927 | Lombard | 55/229 |
| 1,789,931 | 1/1931 | Hegan | 55/229 X |
| 1,866,193 | 7/1932 | Coutant | 55/229 |
| 2,589,956 | 3/1952 | Panteleieff | 261/126 |
| 2,885,195 | 5/1959 | Haselden | 261/112 |
| 3,406,500 | 10/1968 | Deming | 55/241 |
| 3,795,388 | 3/1974 | Toth | 261/112 |

*Primary Examiner*—Frank W. Lutter
*Assistant Examiner*—David L. Lacey
*Attorney, Agent, or Firm*—Shoemaker and Mattare, Ltd.

[57] ABSTRACT

A smoke-stack filter device comprising a plurality of dual-corrugated-plate members disposed at circumferentially spaced apart relationship to one another in an annular space between a pair of coaxially arranged cylinders, said corrugations arranged such that they define a plurality of serpentine passageways extending longitudinally of the cylinders for flow of polluted gases upwardly therethrough, and a treatment liquid flows in a substantially constant quantity down from the top of said members along the corrugated surfaces of said members to form a liquid curtain to wash pollutants from polluted gases and flowing upwardly through the serpentine passageways between the adjacent corrugated members, the downwardly flowing treatment liquid carrying pollutants dissolved or suspended therein to a draining chamber, and the clear filtered gases flowing upwardly to and through vents at the upper ends of the passageways.

9 Claims, 6 Drawing Figures

FILTER DEVICE

BACKGROUND OF THE INVENTION

Air pollution has become one of the most serious public health problems in the world. It not only impairs the health of human beings and endangers the life of other living creatures, but also damages or kills plants and vegetables, resulting in serious harm to the environment and public health. Therefore, many efforts have been made in the prior art to eliminate pollution as far as possible. However, up to now, there has not been found a treatment method capable of eliminating the problem.

SUMMARY OF THE INVENTION

The present invention relates to a filter device, particularly to a smoke-stack filter device, in which a plurality of wave peaks and wave valleys of each of two adjacent dual-corrugated members are arranged at spaced intervals in an annular space between a pair of coaxial cylinders, with the corrugations arranged to form serpentine passageways therebetween, and a treatment liquid at a constant rate flows down by gravity from the top of said dual-corrugated members along the surfaces thereof to form a liquid curtain or film washing downward in the passageways polluted gases exhausted from a smoke-stack or the like rise upward through the passageways between adjacent members and are contacted by the treatment liquid curtain or film on the wave peaks and valleys of the corrugated members, such that pollutants in the gases are dissolved and suspended in the liquid, and the pollutants dissolved or suspended in said treatment liquid or reacted chemically therewith and washed away to a draining chamber and exhausted therefrom through a draining pipe, and the clean filtered gases rise to upper vents and flow out of the system.

OBJECTS OF THE INVENTION

The primary object of this invention is to provide a filter device for use on a smoke-stack, which is simple in construction, low in installation cost and capable of positively filtering the pollutants from the smoke or gases from the smoke stack.

Another object of this invention is to provide a smoke-stack filter device with a minimum probability of malfunction and without any need of maintenance.

Still another object of this invention is to provide a smoke-stack filter device which can be used for furnaces wherein a sub-class or low-class fuel is burned, to cut down cost.

A still further object of this invention is to provide a smoke-stack filter device which can be installed for simultaneous use with more than one smoke-stack and used to eliminate the air pollution from all the smoke stacks.

These and other objects and features of the present invention will become more apparent by reference to the description in connection with the accompanying drawings, in which:

BRIEF DESCRIPTION OF THE DRAWINGS

FIG. 5 is a perspective view of the dual-corrugated-plate member properly used in a filter device of the present invention.

DETAILED DESCRIPTION OF THE INVENTION

Figure 1:
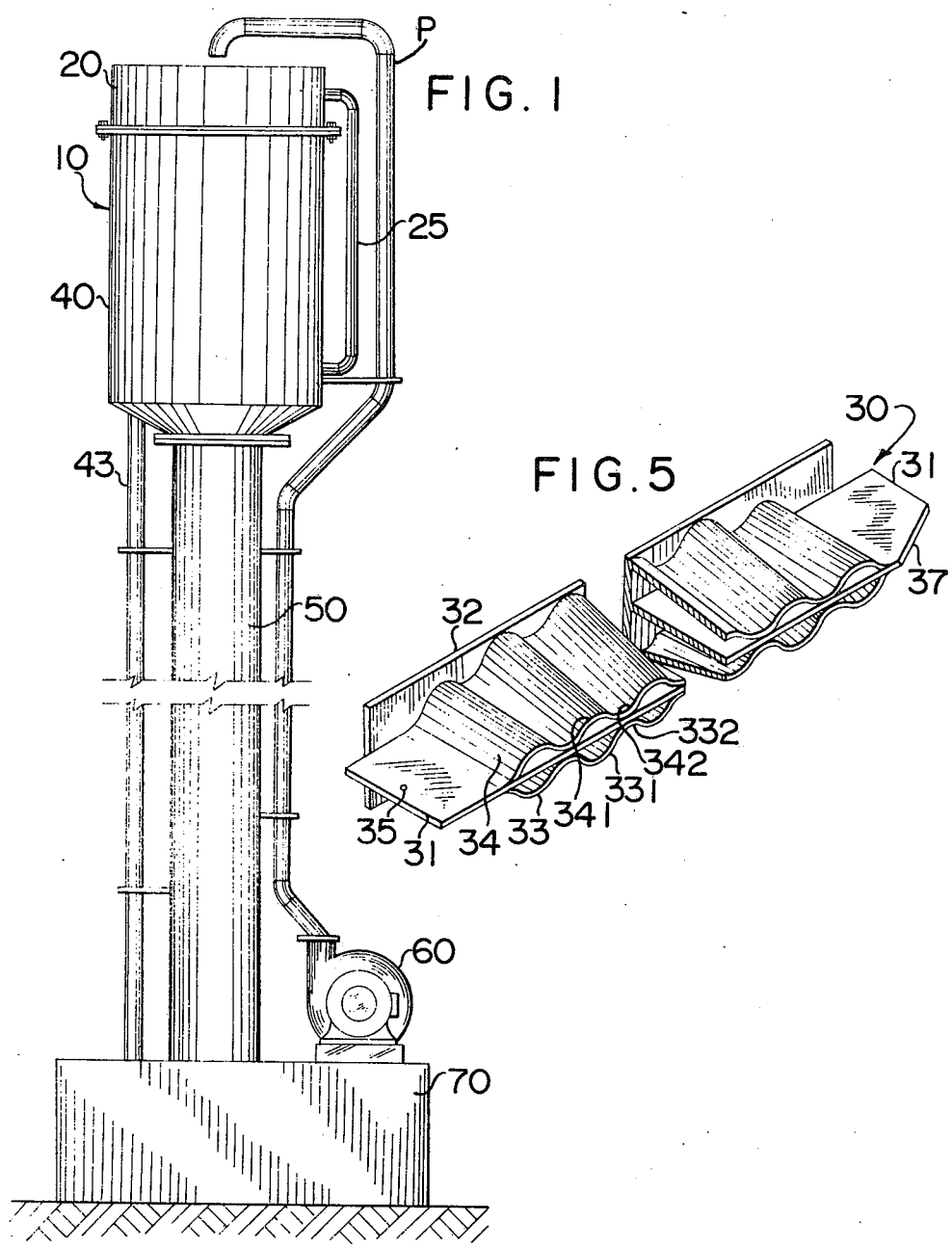
FIG. 1 is a view in elevation showing the exterior of a filter device installed at the top of a smoke-stack according to the present invention.
Figure 2:
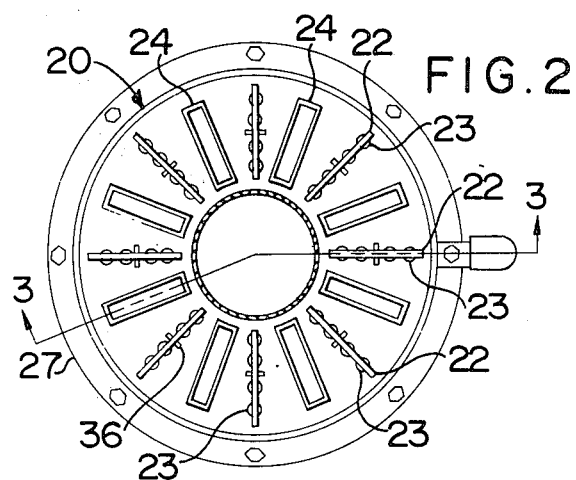
FIG. 2 is a top view of the filter device according to the present invention.

As shown in the drawings, the smoke-stack filter device 10 according to the present invention comprises an outer cylinder or cylindrical body 40, a liquid distribution means or header 20 having a disc-shaped bottom supported on the top of said body 40 and an upstanding side wall, an inner cylinder 26 inside said body 40 and defining an annular space therewith and having a conical bottom 26a, a plurality of longitudinally extending dual-corrugated-plate members 30 arranged longitudinally in the space between said body 40 and cylinder 26 and with the corrugations thereof extending radially. In the center of said liquid distribution header 20 is an upstanding cylindrical wall W defining a filtering trough 21, through a pipe P, provided with a filter screen 211 so that treatment liquid pumped into said trough 21 is filtered upon flowing outwardly through said filtering screen to a plurality of lower liquid outlets or notches 23—23 provided separately on opposite sides of radial slots in the disc-shaped bottom, and disposed at both saides of a support plate 31 of said member 30. The support plates 31 of the members 30 are inserted through radial slots in the bottom of header 20, and the treatment liquid thus flows downward from said outlets 23—23 along the outer surfaces of said members 30 to form a liquid curtain or film having a downward washing force. Between every two support plates 31 are provided vents 24—24, higher than and communicating with opening through the bottom of said distribution header 20 so as to let the gases flowing upwardly through the treatment liquid escape from said space between walls 40 and 26, through the vents 24—24.

An overflow pipe 25 is positioned at a predetermined height in header or disc 20 and is connected with a draining chamber 42 at the bottom of said body 40 so that the excessive treatment liquid can flow to said draining chamber 42 to assist washing or flushing of the accumulated pollutants from said chamber 42. The overflow pipe 25 also serves as a liquid level controller for said header 20 so that the liquid quantity flowing downward through said outlets 23—23 is thus constantly controlled, and the liquid curtain can be formed to enclose or cover the whole outer surface of the corrugated plate members.

The length of the inner cylinder 26 is substantially the same as the corrugated members and the conical bottom end 26a thereof terminates in an apex 261 which is positioned over the center of a smoke stack 50 when in use, whereby the polluted gases rise upward and are evenly dispersed by the guiding action of said conical bottom 26a to achieve a uniform flow into the passageways and a more efficient filtration is thus obtained. The diameter of the cylinder 26 is larger than that of the smoke-stack opening 51 of a smoke stack 50, and at its lower end or edge are provided several serrated cuts 262 and serrated peaks 263 so as to let the treatment liquid flow down from said peaks 263 to said draining chamber 42, and not to flow into the smoke-stack to hamper the upward flow of the polluted gases.

The support plates 31 of said members 30-30 are fastened along their inner edges with fixing clamps 264 to the cylinder 26. The members 30-30 are supported in positions aligned with each respective serrated peak 263 and the gaps or space between adjacent serpentine passageways of adjacent members 30 are substantially uniform.

At the outer circumference of the aforementioned bottom wall of disc of header 20 is provided a flange 27 to fix the header on top of said cylindrical body 40.

As shown in FIG. 5 each member 30 consists of a rectangularly shaped support plate 31 and backplate or back-up plate 32, forming together a T-shaped plate, and the corrugated plates 33, 34 are attached to both sides of said T-shaped plate to form a dual-corrugated-plate member 30 having a generally triangular cross-sectional configuration, while the wave peaks 331, 341 and wave valleys 332, 342 of corrugated plates 33, 34 are opposite to one another respectively. Both ends (head and tail) of the corrugated plates 33, 34 form a round smooth surface with the support plate 31, enabling the treatment liquid to flow readily downwardly therealong.

Figure 3:
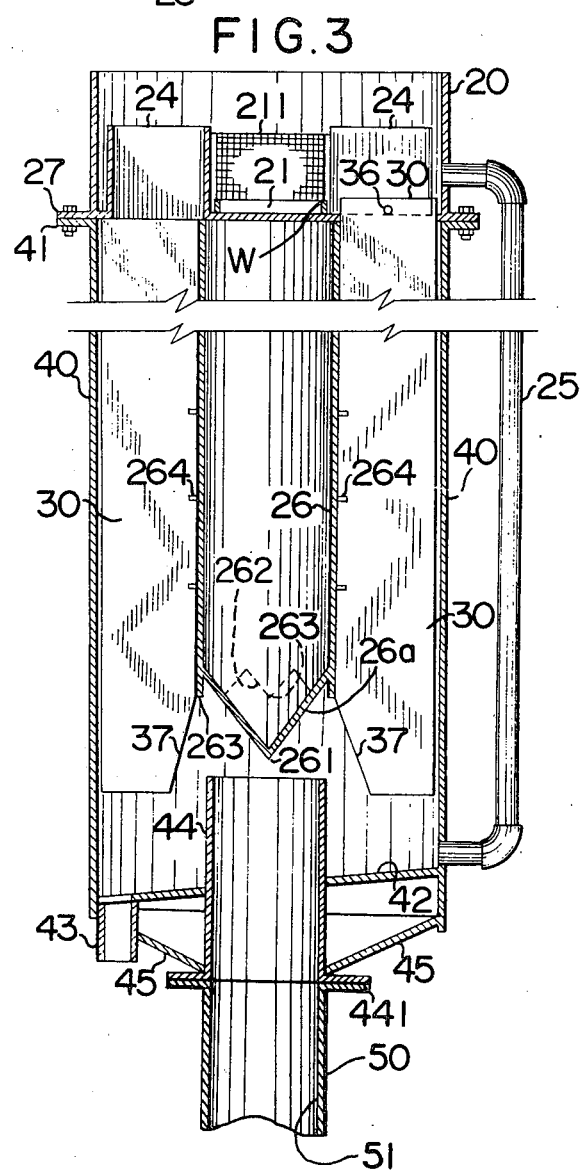
FIG. 3 is a cross-sectional view along line 3—3 in FIG. 2.
Figure 4:
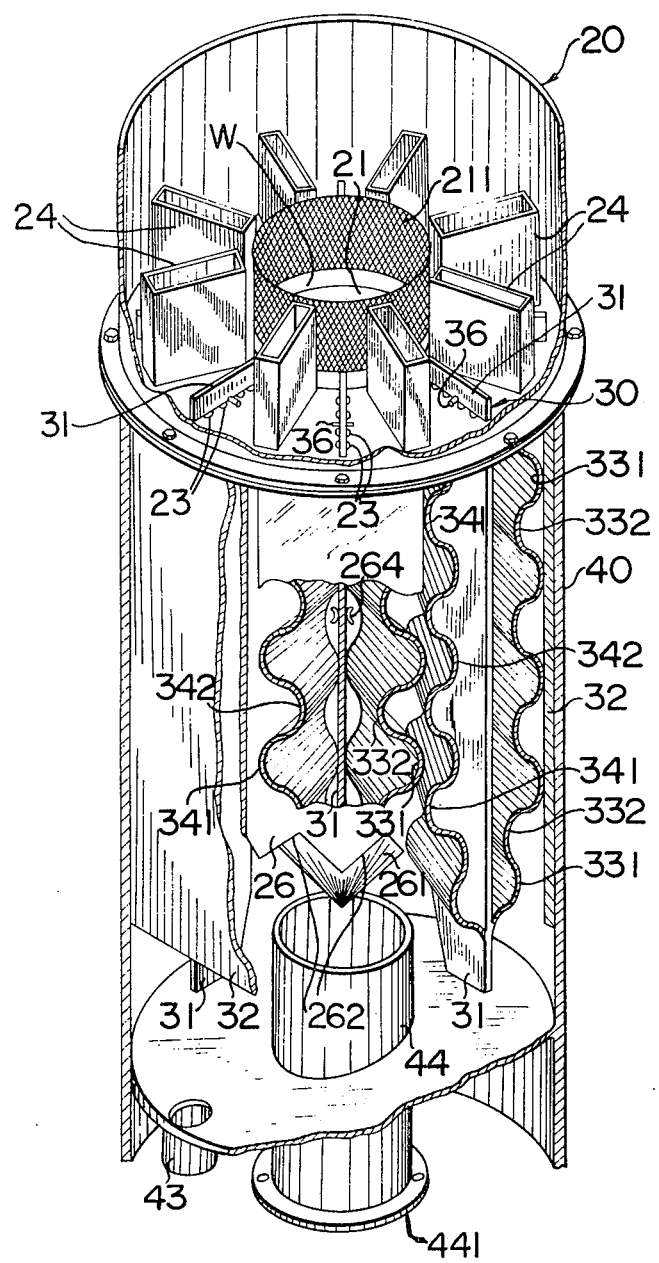
FIG. 4 is a partly cross-sectional perspective view of the filter device according to the present invention.

At an upper portion of each said member 30 is provided a hole 35 in which a pin 36 is fitted to retain the member 30 in position when said member 30 is inserted into the radial slot formed in said disc of header 20, said member 30 hanging beneath said header 20 by means of the pin 36 inserted into said hole 35 as noted previously, the clamps 264 fitted to the cylinder 26 and connected with the members 30, maintain the members, in alignment with the serrated peaks 263 and form a constant space between the members. The tail or bottom end of each said member 30 close to the side of said cylinder 26 is cut off and to form an inclined opening or edge 37 (see FIG. 3) to increase the flow of treatment liquid thereover, enabling a large quantity of pollutants emerging from the smoke-stack to be rapidly contacted with treatment liquid at that location and to wash out a majority of pollutants in the polluted gases so that no polluted gases will accumulate.

Figure 6:
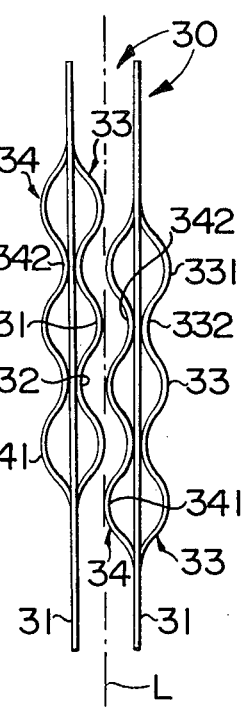
FIG. 6 is a schematical view of the serpentine-shaped flue or passageway formed by two ajacent dual-corrugated-plate members used in a filter device of the present invention.

When the dual-corrugated member 30 is fitted in position, the wave peak and the wave valley of two adjacent members 30-30 are opposite each other, and the wave peaks of two adjacent members 30-30 are aligned to a straight line L, as seen in FIG. 6, or in other words, they lie in a common plane, and the distance therebetween is preferably less than zero. Under the principle of not impairing the performance of the smoke-stack, the flues or passageways are formed as serpentine shapes so as to enable the rising gases to make a positive contact with the wave peaks and valleys as shown in FIG. 6.

When the members 30-30 are fitted to the header 20, they are connected with one another to form a circular body with their respective backplates 32, and further overwrapped or surrounded with the cylindrical body 40. The drainage chamber 42 can be formed as a plane bottom, according to the requirements of usage. A draining outlet 43 is provided at the lowest place of said draining chamber 42 to exhaust the treatment liquid and the pollutants carried thereby.

An open-ended support or attaching cylinder 44 is fitted at the center of the bottom of said cylindrical body 40, and a flange 441 is formed at the bottom edge of said support cylinder 44 so as to be fastened on the preformed flange at the top end of the smoke-stack 50 to put said smoke-stack 50 into communicating alignment with the support cylinder 44. Said support cylinder 44 is further fastened to said cylindrical body 40 by means of a support frame 45 to reinforce it.

The device according to the present invention is installed at the top of a smoke-stack 50; but if a blower is used to exhaust the polluted gases, this device can be mounted directly on the vent or gas exit.

The treatment liquid is pumped continuously by means of a pump 60 from a reservoir 70 through a pipe P into the filtering trough 21 of the header 20 at the top of the device; and when the treatment liquid in said trough 21 reaches a pre-determined level, it overflows through the filter screen 211 into the plurality of liquid outlets 23-23, and flows by gravity through said liquid outlets 23-23 along the outer surfaces of the corrugated members 30-30, respectively, to form a liquid curtain or film producing an effective downward washing force, while the polluted gases exhausted from the smoke-stack 50 flow upward to the apex 261 of the conical body 26a and are dispersed by the guiding action of said apex 261 to rise along and through the serpentine passageway between adjacent members 30-30. Then the polluted gases are contacted with the liquid curtain or film flowing down along the wave peaks and valleys so that the pollutants in the polluted gases are dissolved in or suspended in the treatment liquid or react chemically with it and flow from the corrugated plates of said members and are washed down to the chamber 42 and exhausted through the draining outlet 43, while the gases rise continuously and come into contact with the liquid curtain or film on successive wave peaks and are filtered such that clean gases escape from the vents 24-24.

It is to be understood that in case there is more than one smokestack in a factory, they can be connected with one filter device to achieve the purpose of the present invention. Also since the filter device according to the present invention can effectively perform filtration of polluted air or gases, the grade of fuels used can be of inferior grades and the cost of fuel can therefore be substantially lowered.

In addition, the aforementioned treatment liquid can be chosen most appropriately according to the composition of exhausted polluted gases, such as water or other chemical solutions, and after being used, the treatment liquid can be recovered from the liquid outlets and recirculated after proper treatment.

We claim:
1. A filter device for removing pollutants from polluted gas, comprising: an upright, open-ended cylindrical body, a liquid distribution means on the top of said body closing the upper end thereof and having openings therethrough for flow of liquid into said body; a draining chamber at a bottom portion of said body; a cylinder inside said body coaxial therewith and spaced radially inwardly therefrom defining an annular space therebetween; a plurality of circumferentially spaced apart, longitudinally extending, radially corrugated plate members arranged between said body and cylinder in the annular space; the corrugations of adjacent plate members offset axially from one another such that the peaks of one corrugated member are spaced opposite the valleys of an adjacent corrugated member, thus forming a plurality of longitudinally extending, serpentine passageways open at their upper and lower ends for upward flow of polluted gas into and through the passageways; a vent through the liquid distribution means at the upper end of each of said serpentine passageways; means for supplying a treatment liquid to said liquid distribution means for gravity flow of the liquid through said openings and along said corrugated plate members and thus downwardly through said serpentine passageways to form a liquid film covering the outer surface of said plate members, so that the upward rising polluted gases flowing through the passageways are contacted by the treatment liquid and pollutants are removed from the gas by said treatment liquid and washed out through said draining chamber, whereby a clear, filtered gas flows out of the vents at the upper ends of the passageways.

2. A filter device as in claim 1, wherein the lower end of the cylinder is serrated thus defining downwardly extending peaks, and the corrugated plate members are supported in aligned registry with the location of the peaks.

3. A filter device as in claim 1, wherein attaching means is on the lower end of the filter device to attach the filter device to an upper end of a smoke-stack and the like, a conical bottom in said cylinder having a downwardly extending apex arranged to be disposed in axial alignment with a smoke-stak on which the device is secured, and wherein the lower end of the cylinder is serrated thus defining downwardly extending peaks, and the corrugated plate members are secured in aligned registry with the location of the peaks, so that the conical bottom disperses upwardly flowing gases substantially uniformly into the passageways, and the positioning of the plate members at the apexes of the serrated lower end of the cylinder insures that downwardly flowing treatment liquid does not flow into the smoke-stack and the like.

4. A filter device as in claim 1, wherein the lower ends of the corrugated plate members extend downwardly beyond the lower end of the cylinder and said lower ends terminate at inclined radially inward edges, and an attaching cylinder is connected to the lower end of the cylindrical body and is in downwardly spaced, axial alignment with the cylinder, so that gases flowing upwardly through said attaching cylinder contact the lower end portions of the plate members and substantial amounts of pollutants are removed from the gases at this location.

5. A filter device as in claim 1, wherein the liquid distribution means comprises a trough having an upstanding filter therearound and a disc having said openings therethrough on opposite sides of each of said corrugated plate members, whereby liquid supplied to the trough overflows the trough and passes through the filter and is filtered and then flows through said openings onto said corrugated plate members.

6. A filter device as in claim 5, wherein an overflow pipe is connected with said liquid distribution means at a predetermined elevation to maintain a predetermined level of treatment liquid in the distribution means and thus to obtain a substantially constant flow of treatment liquid downwardly through said passageways.

7. A filter device as in claim 6, wherein the overflow pipe is connected with the draining chamber to flush accumulated pollutants from the draining chamber.

8. A filter device as in claim 7, wherein the draining chamber has an inclined bottom and a drain outlet at a lower portion of the inclined bottom.

9. A filter device as in claim 1, wherein the liquid distribution means comprises a cylindrical member having a disc-shaped bottom supported on top of said cylindrical body, an upstanding side wall around said bottom, and an upstanding cylindrical wall in the center of said bottom defining a trough, a filter screen on top of said trough to filter liquid overflowing the wall of the trough, said bottom having a plurality of radially extending slots therein and notches along opposite sides of the slots, said corrugated plate members comprising a rectangularly shaped support plate and a corrugated plate fixed to each of the opposite sides thereof with the peaks and valleys of the corrugations on opposite sides of the support plate aligned with one another and with opposite ends of the corrugated plates curving smoothly into the support plate, a back-up plate fixed along one edge of the support plate and along one end of the corrugations, said back-up plates of adjacent plate members disposed in edge-to-edge relationship with one another and disposed against an inner surface of the cylindrical body, the upper ends of the support plates extending through the radial slots in the disc-shaped bottom and having an opening therethrough above the bottom, a pin extended through the the opening and supported on top of the bottom in spanning relation to the slots to suspend the plate members in said space, and clamp members fixed to an outer surface of the cylinder and connected with an adjacent, inner longitudinal edge of the plate members to maintain the plate members in evenly spaced relationship with one another, said notches on opposite sides of the support plates comprising said openings for flow of liquid downwardly over the plate members.

* * * * *